(12) United States Patent
Ulrich et al.

(10) Patent No.: US 10,453,009 B2
(45) Date of Patent: Oct. 22, 2019

(54) METHOD AND APPARATUS FOR DETECTING AND/OR UTILIZING SALES ANOMALIES TO IMPROVE STORE MANAGEMENT

(71) Applicant: Walmart Apollo, LLC, Bentonville, AR (US)

(72) Inventors: Richard B. Ulrich, Bentonville, AR (US); Alvin S. Taulbee, Springdale, AR (US); Steven E. Thomas, Bella Vista, AR (US)

(73) Assignee: Walmart, Apollo, LLC, Bentonville, AR (US)

( * ) Notice: Subject to any disclaimer, the term of this patent is extended or adjusted under 35 U.S.C. 154(b) by 504 days.

(21) Appl. No.: 15/184,358

(22) Filed: Jun. 16, 2016

(65) Prior Publication Data
US 2016/0371613 A1    Dec. 22, 2016

Related U.S. Application Data (60) Provisional application No. 62/182,394, filed on Jun. 19, 2015.

(51) Int. Cl.
*G06Q 10/06* (2012.01)
*G06Q 10/08* (2012.01)

(52) U.S. Cl.
CPC ....... *G06Q 10/0631* (2013.01); *G06Q 10/087* (2013.01)

(58) Field of Classification Search
CPC .......................... G06Q 10/0631; G06Q 10/087
See application file for complete search history.

(56) References Cited

U.S. PATENT DOCUMENTS

| | | | |
|---|---|---|---|
| 7,240,027 B2* | 7/2007 | McConnell | G06Q 10/087 705/16 |
| 8,321,303 B1 | 11/2012 | Krishnamurthy | |
| 2001/0049690 A1* | 12/2001 | McConnell | G06Q 10/087 |
| 2003/0187759 A1* | 10/2003 | Arthus | G06Q 20/04 705/30 |
| 2006/0195370 A1 | 8/2006 | Howarth | |
| 2007/0442651 | 5/2007 | Swan et al. | |

(Continued)

FOREIGN PATENT DOCUMENTS

WO    1995030201    11/1995

OTHER PUBLICATIONS

Sales Performance Management Solutions, Aug. 3, 2015, 8 pp.

(Continued)

*Primary Examiner* — Sujay Koneru
(74) *Attorney, Agent, or Firm* — Fitch, Even, Tabin & Flannery LLP (57) ABSTRACT

In some embodiments, systems, apparatus and methods are provided herein useful to improve store management by reducing the instances that may cause lost sales or result in a customer assistance inquiry. The solutions disclosed herein allow users to start with sales frequency to identify potential alerts or anomalies and then optionally allows for further customization and/or prioritization regarding the potential anomalies in a way that will address specific needs or concerns of a particular system user and allows for the system to be tuned or changed over time as desired.

25 Claims, 6 Drawing Sheets

(56) References Cited

U.S. PATENT DOCUMENTS

| | | | |
|---|---|---|---|
| 2009/0287630 A1* | 11/2009 | Kaiser | G06N 5/02 |
| | | | 706/50 |
| 2010/0131526 A1* | 5/2010 | Sun | G06F 17/30542 |
| | | | 707/758 |
| 2010/0287029 A1* | 11/2010 | Dodge | G06Q 30/02 |
| | | | 705/7.31 |
| 2011/0225023 A1* | 9/2011 | Evens | G06Q 10/087 |
| | | | 705/7.31 |
| 2012/0035982 A1 | 2/2012 | Narayan | |
| 2013/0179220 A1* | 7/2013 | Notani | G06Q 30/0202 |
| | | | 705/7.31 |
| 2014/0039950 A1 | 2/2014 | Appel | |
| 2014/0143186 A1* | 5/2014 | Bala | G06N 5/025 |
| | | | 706/12 |
| 2014/0201042 A1* | 7/2014 | Meyer | G06Q 10/087 |
| | | | 705/28 |
| 2015/0100433 A1* | 4/2015 | Choy | G06Q 30/0269 |
| | | | 705/14.69 |
| 2016/0048798 A1* | 2/2016 | Meyer | G06Q 10/087 |
| | | | 705/28 |

OTHER PUBLICATIONS

UKIPO; App. No. GB1610618.9; Combined Search and Examination Report under Section 17(5)(b) and Abbreviated Examination Report under Section 18(3) dated Nov. 29, 2016.

UKIPO; App. No. GB1610618.9; Examination Report under Section 18(3) dated Sep. 14, 2018.

* cited by examiner

METHOD AND APPARATUS FOR DETECTING AND/OR UTILIZING SALES ANOMALIES TO IMPROVE STORE MANAGEMENT

CROSS-REFERENCE TO RELATED APPLICATION

This application claims the benefit of U.S. Provisional Application No. 62/182,394, filed Jun. 19, 2015, and is incorporated herein by reference in its entirety.

TECHNICAL FIELD

This invention relates generally to retail store management and, more particularly, to systems, apparatus and methods for utilizing store system data, such as sales anomalies, to improving store management.

BACKGROUND

Some primary objectives of conventional retail stores are to provide consumers with the items they need and to do so efficiently so as to maximize sales. Some leading causes of lost sales are: lack of product availability, such as out of stock product (e.g., either product missing from shelf but elsewhere in the store/on-site or missing from shelf and entirely from that particular store/not on-site); moved or misplaced product; mislabeled product; and other instances where there is some problem or error associated with the displayed product (e.g., front-faced product is damaged, display is damaged or not facing the product appropriately, etc.). Currently, the only options for a consumer who cannot find what they are looking for are to forgo purchasing the product (i.e., meaning a lost sale) or to find a sales associate or employee and ask for their assistance in locating the product.

In conventional retail establishments or stores, associates are relied upon heavily to receive deliveries, inventory new product, place, check, count and replenish displayed product, (e.g., put product on shelves, in end units, in modulars, features, etc.), conduct price changes and reorganize the sales floor (e.g., move in and out seasonal product, freshen-up sales floor, etc.). Thus, an associate is not always readily available to render such assistance to a consumer and, even when they are, the time it takes for the associate to render this assistance is typically valuable time taken away from the other important things the associate is tasked with doing. In addition, the harder it is for the consumer to locate an associate to render such assistance, the more likely the consumer will give-up, get frustrated or simply not enjoy their overall shopping experience. Thus, the shopping experience would be more enjoyable to the consumer and more efficient for the store if the types of situations that lead to a customer needing the assistance of a store employee/associate are minimized or at least reduced. For example, the store could be operated more efficiently if there was a way to detect and correct the problems that typically lead to a customer needing the assistance of a store associate/employee to prevent the situation from presenting itself in the first place.

Some conventional systems used by stores to help improve sales and address some of these issues rely on trend analysis. For example, some stores use software systems that help remind or notify stores certain items that sell better on certain days (e.g., when it is raining, items a, b, c sell more than normal) or that sell better during certain times of year (e.g., during this time of year or season, items x, y, z sell more than normal). While these systems are helpful, their focus on analyzing sales by volume and/or sales by season or time of year limits their usefulness to just noting trends and they are not capable of addressing the more day-to-day problems stores face with customer assistance issues and lost sales due to some of the problems mentioned above (e.g., lack of product availability due to out of stock product, moved or misplaced product; mislabeled product; and other instances where there is some problem or error associated with a displayed product). For example, conventional software systems such as these do not detect when a product is oddly not selling over a short period of time particularly when the store's inventory management systems indicate the product is "on hand" (meaning on the shelf). Because of this, they also do not reduce the number of incidents where a customer requires store associate assistance.

Another shortcoming with conventional systems is that they do not allow store management to customize the system to focus on particular areas or items of interest and/or give store management the ability to treat certain items, store departments, stores or regions of stores differently from other items, store departments, stores or regions of stores. Similarly, the conventional systems are not readily changeable or tunable to re-focus the system on different things over time. Thus, store management may need to wade through mountains of data just to find the data points they care about which does not help run the store more efficiently.

In addition to the above issues, current store systems do not take advantage of the increased use of technology by store associates. Over the past several years, the number of stores that have their employees utilize mobile devices has dramatically increased. For example, some stores use hand-held devices to allow associates to do on-the-spot price checks, inventory checks, and pick requests, particularly with respect to addressing the above-identified problems that result in customers needing and/or seeking associate assistance. Thus, conventional retail stores have not taken full advantage of this increased use of technology by stores in such a way that helps address some of the above-mentioned problems (e.g., lost sales and customer need for store associate assistance).

Accordingly, it has been determined that a need exists for improved systems, apparatus and methods for managing stores to overcome the above-mentioned problems.

BRIEF DESCRIPTION OF THE DRAWINGS

Disclosed herein are embodiments of systems, apparatuses and methods pertaining to retail store management and improving same. This description includes drawings, wherein.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatus and methods are provided herein that are useful to improve store management, improve the overall shopping experience of the customer, and address the problems or shortcomings with conventional stores and systems discussed above. In some embodiments, a sales anomaly engine is disclosed which may be utilized to detect or identify sales anomalies so that they may be addressed by store associates in an effort to reduce or even minimize lost sales and/or instances where a customer needs store associate assistance because of any of the above-identified problems (e.g., lack of product availability due to out of stock product, moved or misplaced product; mislabeled product; and other instances where there is some problem or error associated with a displayed product). In some embodiments, a sales anomaly engine looks at actual sales and compares same to sales frequency or velocity data, rather than sales volume data in order to detect more day-to-day problems discussed above rather than just identifying trends that the store can utilize to improve sales. For example, by looking for anomalies in consumption or sales data by sales frequency or velocity rather than volume, situations may be identified and checked on before they result in lost sales or interrupting store employee activities with customer assistance issues (e.g., customer inquiries). This is true even though other store systems may fail to see the problem because they show ample inventory of a particular product exists or is on hand. In this way, situations where on hand inventory is reserved, damaged, mispriced, etc. can be detected and addressed before it results in a lost sale or request for customer assistance which will, in turn, result in a more enjoyable shopping experience by the customer and more efficient store management and operation by the retailer.

In some forms, systems, apparatus and methods are provided that calculate rate of sale by frequency of items sold (e.g., sales or consumption frequency, velocity of individual item sales, etc.) rather than volume sold, and further allow for the list of potential anomalies to be customized and/or prioritized so that only those desired to be monitored are looked at and/or those most concerning are addressed first. How the list of potential anomalies is customized and/or prioritized is left up to store management so that they can tweak and change how the system is used whenever desired. For example, the customization or prioritization may be based on many different factors determined by store (e.g., profit margin, percent of anomaly (greatest to lowest), average consumption (biggest sellers first), profit dollars (actual dollars potential loss), expense or value of item, whether another store process has been performed (e.g., has a "Pick Request" been executed based on a "Count Request", whether a delivery was completed with that SKU within the past x amount of time, RFID data, BIN data, etc.)).

Typical on shelf availability (OSA) or on shelf customer availability (OSCA) software relies heavily on volume (e.g., looking at volume of sales data over a period of time, such as a five week trend), which leads to many more false alarms being generated and thereby creating more work and follow-up for store employees and making store management less efficient. For example, during one proof of concept test period typical OSA/OSCA software issued eighteen alerts for one department after analyzing volume data over a five week period. Of those eighteen alerts, product was found on the shelf seventeen times (meaning only one out of seventeen were truly out of stock and worthy of the alert). Thus, the OSA/OSCA software had an accuracy of five percent (5%). Conversely, the solutions disclosed herein issued twenty event alerts of which at least fifteen were truly out of stock improving accuracy to seventy five percent (75%) at a minimum. The solution was prioritized by the user using a sixty percent (60%) confidence threshold. Several of the fifteen items were restocked before analysis or validation could occur, but eight of the twenty items alerts were issued for were studied before restocking. One of the eight notices alerted employees to the fact a particular product had seven of the wrong item faced in front of (or fronted ahead of) the two remaining correct items still in stock on that particular hang peg or hook. Another one of the eight notices alerted about a situation where a wrong product was placed on the shelf where another product was supposed to be placed, which made it appear the shelf was full. Other store data confirms that at least seven other items were restocked before analysis or validation could occur, which together with the other eight brings the total to fifteen out of twenty that needed restocking. This also means that it is possible the accuracy was even higher than seventy five percent (75%). Thus, in this example, the fact the solutions disclosed herein used frequency of sale and a calculated standard deviation to create alerts, yielded a much more accurate result (meaning employees were distracted from their other tasks far fewer times). In short, it is statistically more accurate and leads to less false alarms than conventional OSA/OSCA software which means store associates are interrupted less frequently and store management runs more efficiently.

While the solutions disclosed herein allow users to start with sales frequency to identify potential alerts or anomalies, they also allow the user to dig deeper and customize and/or prioritize the potential anomalies in a way that will address specific needs or concerns of a particular manager or management team. This flexibility accounts for the fact items of interest may vary from product category to product category, from department to department, from store to store, from region to region, and even from one corporate management team to another. It also accounts for the fact items of interest may change or evolve over time. In some forms, the solutions disclosed herein may be tweaked or changed by each product category manager, store department manager, store manager, regional manager or corporate headquarters managers, in order to address specific concerns or areas of interest of each manager. For example, in one region certain items sold by a store might be of more interest than they are in another region (e.g., warm clothes may be more important in northern regions than southern regions; conversely, beach ware may be more important for coastal regions than other inland regions, etc.). In other examples, what is important to a store department manager in charge of outdoor goods likely is not the same as what is important to a store department manager in charge of electronics. Similarly, each product category manager will likely have their own list of important items they wish to monitor for anomalies so that these anomalies can be checked or investigated before resulting in a lost sale or customer assistance situation. Furthermore, each of these managers may have certain items that he or she considers more important than others and, thus, wish to prioritize the anomalies to address the most critical ones first (or the ones they consider most critical). As an example of this, a manager of an electronics department in a store may consider anomalies associated with more profitable items to be more important to address than those associate with a lower profit product. In other instances, the managers may prioritize items that are top sellers over those that are slow sellers as there likely is more time to address the latter than the former.

As mentioned above, another benefit of the flexibility of at least some of the solutions disclosed herein is that the solutions can be tweaked or changed over time or for different uses. For example, store management may decide to focus on particular problems it has been having with the sales of a first product (e.g., product ABC) for a period of time. Once those problems have been addressed, the store management may decide to shift focus over to a second product (e.g., product XYZ) that it has been having problems with and wishes to resolve. In still other situations, the product management team may simply want to add the second product to the list of items it is already monitoring (i.e., which already includes the first product). As also mentioned above, the solutions disclosed herein allow management to prioritize the items or anomalies that are eventually detected (e.g., prioritizing anomalies associated with the second product over the first or vice versa). In another example, store management may desire to change the products or items it hopes to improve sales for or reduce associated customer assistance requests with after a period of time and can do so by updating the customization and/or prioritization of the solutions disclosed herein. This flexibility allows the disclosed solutions to be used in different ways by different users, in different ways within the same product category/department/store/region, and in different ways over several different categories/departments/stores/regions. For example, such solutions can be rolled out for an entire store, by department (e.g., outdoor department), by product category (e.g., bike), by product sub-category (e.g., bike seat), etc. This allows the solutions presented herein to be tunable or customizable so that weighting can be done differently to figure out what best fits a particular store, department, category, etc.

Figure 1:
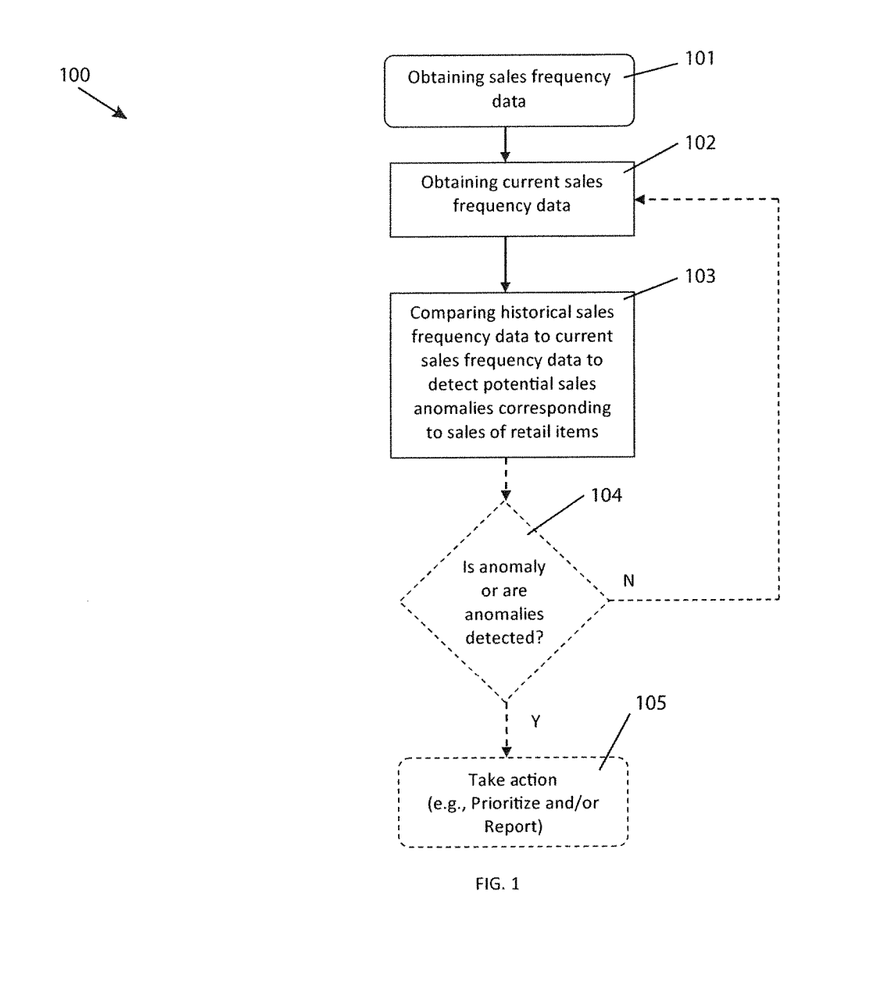
FIG. 1 is a flow diagram of a general process in accordance with some embodiments.

Turning now to the drawing figures, in FIG. 1 a flow diagram of a general process in accordance with some embodiments disclosed herein is illustrated and referred to generally by reference numeral 100. The flow diagram 100 describes a process or method for analyzing sales of retail items sold in a retail sales environment that, by a control circuit: obtains or reads historical sales frequency data for retail items from a retail item management database in step 101; obtains or reads current sales frequency data for the retail items sold in association with the retail sales environment from a point of sale database associated with the retail sales environment in step 102 (e.g., data relating to actual or recent transactions whether real-time or within a predetermined period of time of the actual transaction); and compares the historical sales frequency data to the current sales frequency data in step 103 to detect potential sales anomalies corresponding to sales of the retail items. In some forms, the process and method may simply perform this task of determining or identifying potential sales anomalies. In other forms, however, the process or method may further determine if an anomaly or anomalies have been detected as illustrated in step 104 and, if so, take some form of action in step 105 in response to the detected anomaly or anomalies (e.g., notifying the user or reporting the anomaly/anomalies, prioritizing the anomaly/anomalies, prioritizing and reporting the anomaly/anomalies, etc.). If no anomaly or anomalies are detected in step 104, the process or method may return to step 102 and obtain new sales frequency data.

In one form, the process or method will be run on a retail store system that has a retail item management database or system and will include creating the historical sales frequency data for the retail items sold by the store based on historical sales data and storing the historical sales data in the retail item management database. In a preferred form, creating the historical sales frequency data comprises calculating sales frequency for each individual item over a period of time to determine the frequency for that item without regard to how many are sold in that same period of time (instead of volume of items sold over that time period), and comparing the historical sales frequency data for an item to the current sales frequency data for that item to detect anomalies. The user will be notified of the detected sales anomalies via the management system. For example, the process or system may transmit information relating to the detected sales anomalies from the item management system to a remote unit via a network. In some forms, the remote unit is a mobile electronic or handheld device and the network is a wireless network, and transmitting information relating to the detected anomalies comprises wirelessly communicating an anomaly notice to the mobile electronic or handheld device via the wireless network. The anomaly notice could be sent each time an anomaly is detected or after a period of time and include one or more anomalies. For example, in a preferred form, the anomaly notice will comprise a report of all anomalies detected over a predetermined or set period of time prioritized in a manner configured by a user of the system.

Prioritization of the detected anomalies may be done in a variety of ways. For example, in one form, prioritization may be performed by the management system (e.g., retail item management system) based on predetermined factors. In another example, the detected anomalies may be prioritized by weighting the anomalies based on at least one of the following predetermined factors: profit margin, profit dollars, percent of anomaly, average consumption, expense or value of item and/or result of other retail store processes. Prioritizing the detected anomalies based on the result of other retail store processes may include prioritizing the detected anomalies based on whether at least one of the following has occurred: a pick request has been made within a predetermined amount of time for the identified item; a count request has been made within a predetermined amount of time for the identified item, a delivery has been made within a predetermined amount of time for the identified item, an entry has been made in a store tracking or identification system, and/or an entry has been made in a store inventory system.

Although the process and method illustrated in FIG. 1 mention comparing the historical sales frequency data to the current sales frequency data to detect potential anomalies, it should be understood that this could be done in a variety of ways as well. For example, in one form this comparison could be conducted real-time as the current sales frequency data is received. In other forms, it could be done after a predetermined period of time has passed (meaning the current sales data is not real-time, but recent). In yet other forms, the process and method may wait to compare the historical sales frequency data to current sales frequency data until a minimum threshold of either historical sales or current sales (or both) have occurred and at least one standard deviation has been performed on the historical sales frequency data to account for variation in the historical sales frequency data.

In some forms, historical sales frequency data or sales data will refer to data corresponding to previous or prior periods of time in terms of sales frequency or sales data for an item whereas current sales frequency data or sales data will refer to data corresponding to a current or more recent period of time in terms of sales frequency data or sales data. Depending on the embodiment and desired comparison range and frequency, historical sales frequency data may be considered sales data as early as one day prior to the current time, twelve hours prior to the current time, one hour prior to the current time, etc. In other forms, it may be older than that. For example, it may be desired to compare current sales frequency data to sales frequency data from this time last year. Furthermore, the historical sales frequency data used (e.g., retrieved from memory) comprises stored values that may have been, at one time, current sales frequency data. This historical sales frequency data may correspond to a particular date, season or time of year, etc. In one example, if the current date is June 15th, then the historical values or sales frequency data that correspond to June $15^{th}$ in prior years or just a previous year may be used, (e.g., either historical average values from previous years on this date, during the week of June 15th, during the month of June, etc.). As mentioned above, one advantage of the solutions offered herein is that they may be setup or customized as desired by the user and changed as desired. Thus, the historical sales frequency data can contain any data that is older than the current sales frequency data being compared to it.

The process and method of FIG. 1 could be entirely performed by a single controller or control circuit (e.g., a system comprising one computer or electronic device) or, alternatively, it could be performed by a multi-device system. For example, the process or method of FIG. 1 may be performed on a single, an all-in-one electronic device in smaller stores or kiosks that only have a single electronic device to serve as both POS and inventory management device, etc. In another example, a store with a central controller or control system and one or more point of sale (POS) units connected to the central controller via a network could perform the process or method of FIG. 1. In still other forms, much larger systems comprising numerous different stores, each with a central controller and remote POS units, could perform the process or method of FIG. 1, even some having the plurality of store systems connected to a central or master processing system or center. One benefit of the solution disclosed herein is that it could be rolled out at multiple levels within an organization if desired. For example, it could be performed on a single all-in-one POS system, an on-site store system having a central controller and remote POS systems connected via a network and/or a larger, more complex system with functional assets both on-site and off-site.

In larger systems like the latter examples provided, the process and method of FIG. 1 may further involve creating historical sales frequency data for retail items by creating a transaction log (Tlog) containing historical sales data for the items within the store(s). In such systems, comparing historical sales frequency data to the current sales frequency data may entail comparing actual transactions to historical sales data on an individual per item basis and making this comparison for a predetermined number of the retail items within the store(s) as identified by a management system user so that the system may be used to track as few or as many retail items carried by the retail store as desired. The process and method may further provide the user the option to select the predetermined number of items to be compared to historical sales data by the retail items in the entire store, within a specific department within the store, within a specific category within the specific department and/or within a sub-category within the specific category so that the items monitored for sales anomalies may be customized as desired. Thus, in some forms the solutions disclosed herein may be best suited for use at the higher corporate level, such as at corporate headquarters or a central processing center, and simply be setup to provide anomaly reports or similar notifications to specific managers at specific stores or in specific regions. However, it should be understood that in alternate forms, the solutions disclosed herein could easily be used at the regional and individual store level as well by individual managers who want to utilize such solutions to more efficiently manage their tasks and job responsibilities.

Figure 2:
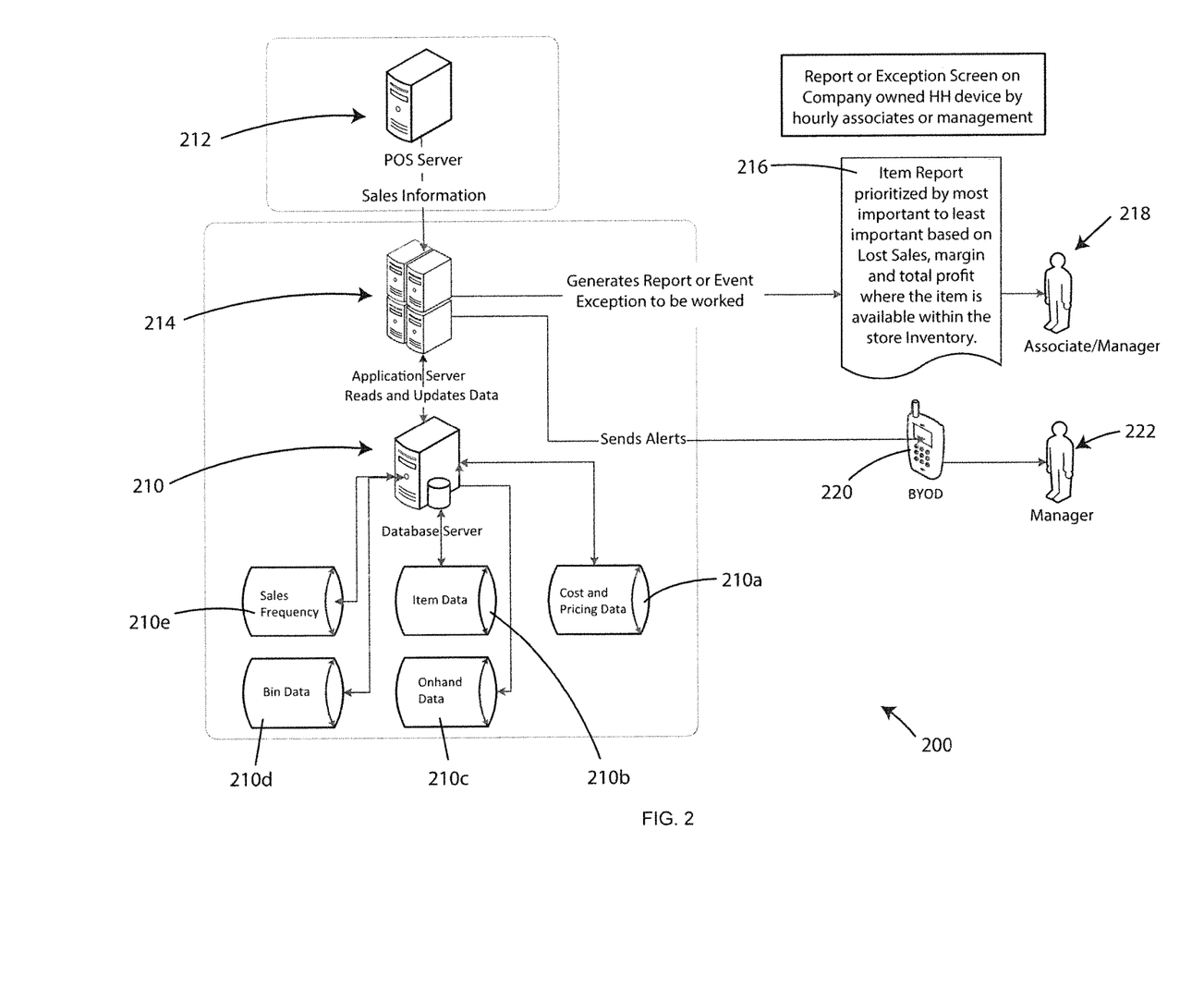
FIG. 2 is a diagram of an exemplary system or apparatus in accordance with several embodiments.
Figure 3A:
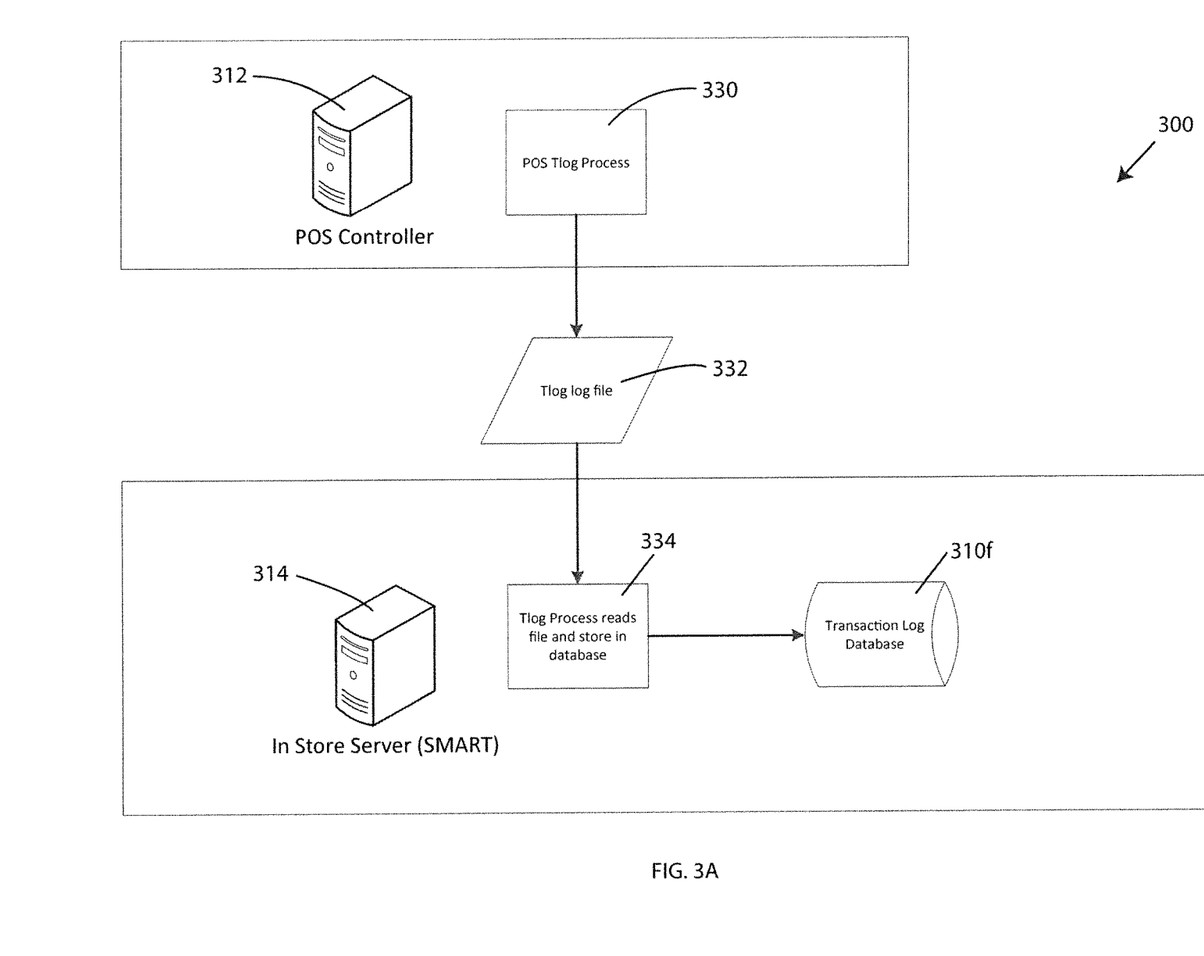
FIGS. 3A-3D are flow diagrams of another, more specific, process in accordance with several embodiments.
Figure 3B:
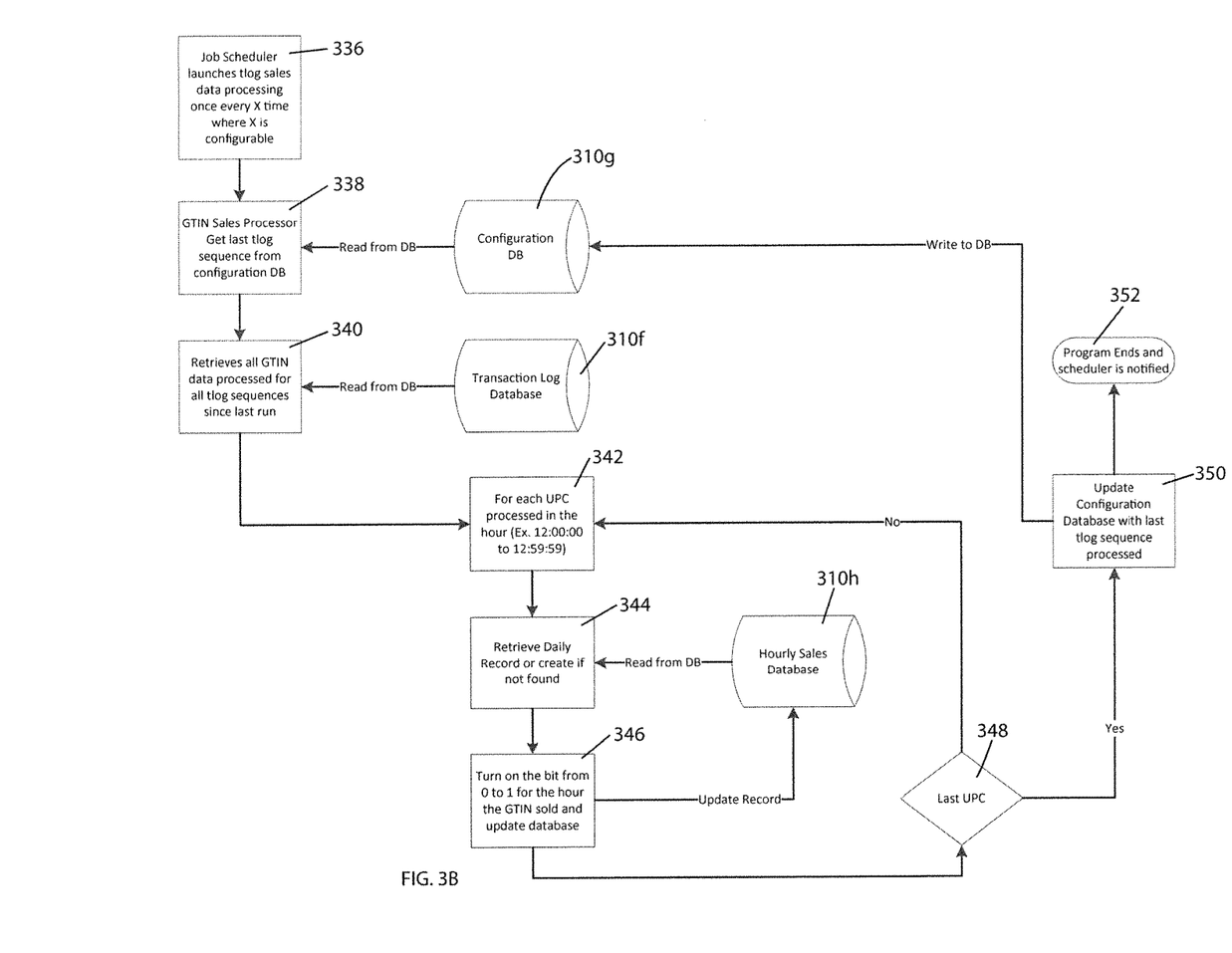
Figure 3C:
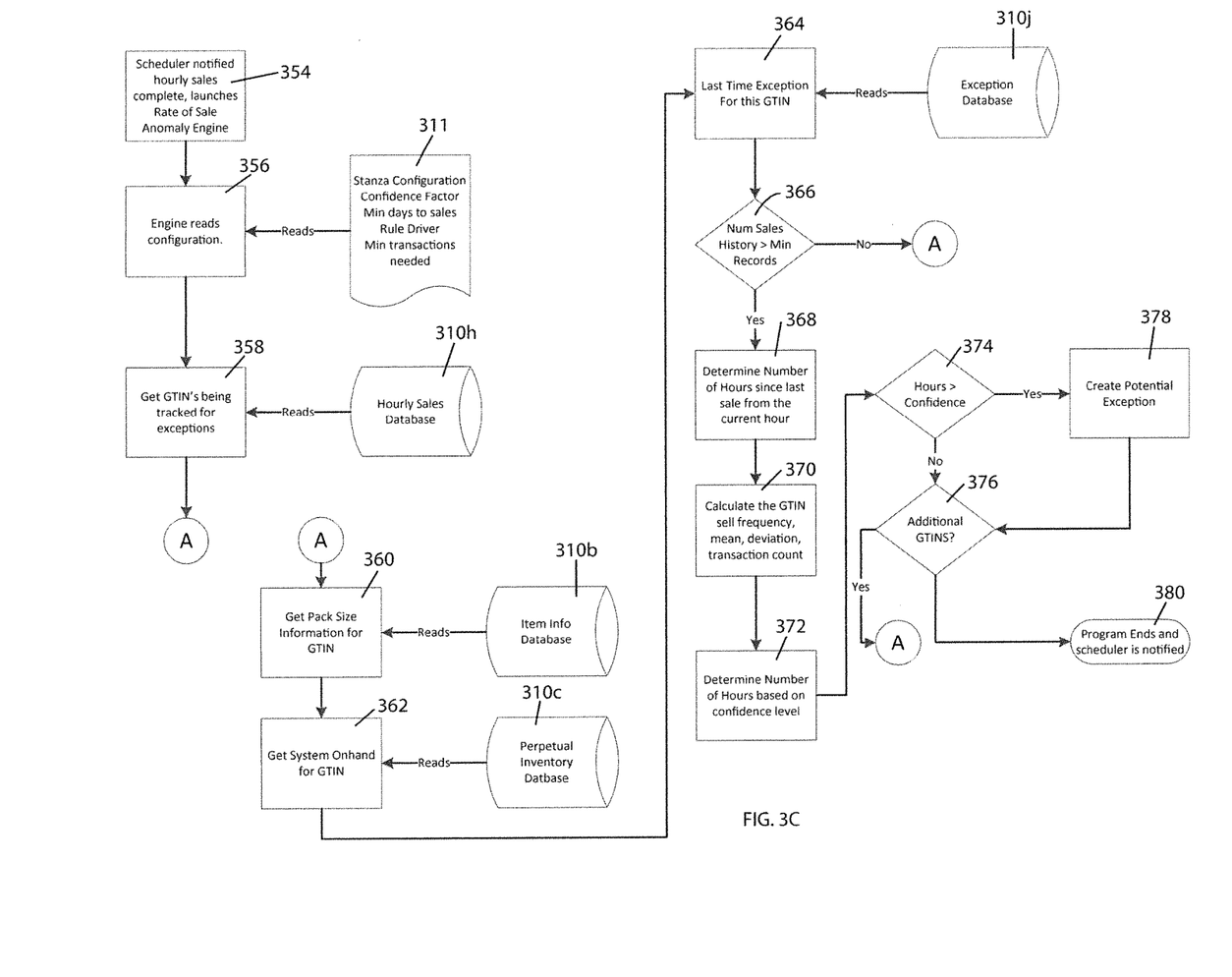
Figure 3D:
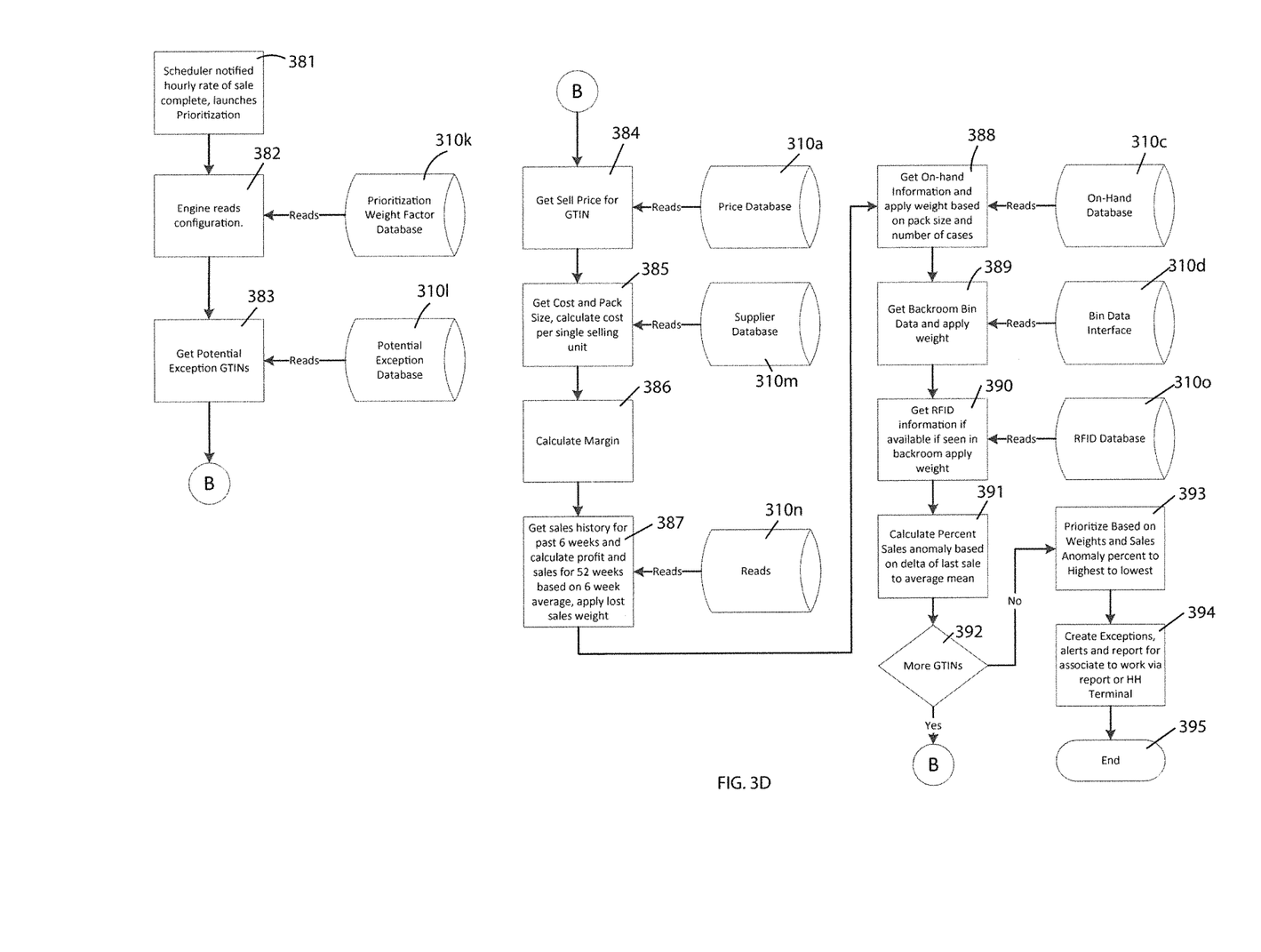

Turning now to FIG. 2, there is illustrated an inventory management system 200 capable of identifying possible sales anomalies to improve sales and/or reduce incidents of customer assistance in accordance with some embodiments of the solutions disclosed herein. In this exemplary illustration, the system includes a database 210 of historical sales frequency data for retail items, a point of sale device 212 for processing current transactions for the retail items, and a control circuit 214 in communication with the database and point of sale device configured to compare current sales frequency data to the historical sales frequency data to detect possible sales anomalies via the management system. As mentioned above, while this embodiment shows at least three components, it should be understood that in alternate embodiments these items may all be combined in a single system or control device, such as for smaller retail shops that do not require separate components (e.g., an electronic device that serves as the POS and includes the controller and database). Similarly, it should be understood that various components, such as the database, could be physically connected to one another or connected via network and may be located elsewhere, such as having the database cloud based. In some forms, just the POS device 212 could be present on-site at a store and the remaining components located elsewhere (e.g., cloud based, at a regional or corporate headquarters, a processing center, etc.). Alternatively, a POS device and controller could be present on-site but remote from one another, while another controller is also located off-site or elsewhere so that the system can be run by on-site management as well as off-site management if desired.

Turning back to the embodiment of FIG. 2, a more complex system 200 is illustrated as an exemplary embodiment having a POS controller 212, such as POS server, connected via a network to controller 214, which in this embodiment is illustrated at least in part as an application server, that is connected itself via network to a database 210, which may include a plurality of different databases such as the cost and pricing database 210a (containing information on the cost and pricing of items sold by the store), item database 210b (containing information on the items sold by the store), on-hand database 210c (containing information pertaining to the items that are on-hand on the sales floor either on a shelf, feature or modular display, etc.), bin database 210d (containing information pertaining to items on-site at a particular store but in bins in a backroom or otherwise off the sales floor and/or on-hand at another location such as an off-site distribution center, etc.), and sales frequency database 210e (such as that discussed above).

While the control circuit 214 is illustrated in FIG. 2 and embodied as a server, depending on the embodiment, the control circuit 214 may generally be one or more computer devices or other electronic devices. Such a control circuit can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. In some embodiments, the control circuit is configured (for example, by using corresponding programming stored in a separate or integrated memory as will be well understood by those skilled in the art) to carry out one or more of the steps, actions, and/or functions described herein.

In a preferred form, one or more user interface devices would also be connected to the system 200 via a network connection, such as keyboards, displays, computer terminals, smart phones, handheld devices, etc. For example, in the exemplary embodiment illustrated in FIG. 2, system 200 includes an electronic device 216, such as a handheld device or computer system provided by the store to a user or employee 218 (e.g., such as a store associate, manager, contractor, etc.), which the employee 218 may use to access or receive sales anomaly reports or notifications generated by system 200. In alternate forms, the system may be setup to allow user access via their own device 220 (e.g., bring you own device or BYOD) which the user 222 can use to either access or read anomaly reports or notifications generated by system 200. In a preferred form and as mentioned above, the system will provide a customized and/or prioritized anomaly report as configured or setup by a user or management. For example, some level of store management may configure system 200 to monitor for anomalies with respect to certain item sales and may further prioritize those items based on any of the factors discussed above (e.g., profit margin, profit dollars, percent of anomaly, average consumption, expense or value of item and/or result of other retail store processes, etc.). In some forms, the control circuit 214 prioritizes the detected anomalies based on whether one of the following has recently occurred: a pick request has been made within a predetermined amount of time for the identified item; a count request has been made within a predetermined amount of time for the identified item; a delivery has been made within a predetermined amount of time for the identified item; an entry has been made in a store tracking or identification system; and/or an entry has been made in a store inventory system.

As mentioned with the prior embodiment described in FIG. 1, it should be understood that system 200 may also be configured to wait to compare the actual transactions to the historical sales data until a minimum threshold of historical sales have occurred and at least one standard deviation has been performed on the historical sales data to account for variation in the historical sales data. In some forms, the database of historical sales data comprises a transaction log (Tlog) containing historical sales data for the items within the store, and the control circuit is configured to compare the actual transactions to the Tlog data on an individual per item basis and for a predetermined number of the retail items within the store as identified by the system user so that the system may be used to track as few or as many retail items carried by the retail store as desired. The control circuit 214 may be configured to allow the user to select the predetermined number of items to be compared to historical sales data by all retail items or individual retail items within: the entire store, a specific department within the store, a specific category within the specific department and/or a specific sub-category within the specific category, so that the items monitored for sales anomalies may be customized as desired. In addition, the system could be configured to run manually when desired by a user or, alternatively, could be configured to run automatically by checking the Tlog every x amount of time and identifying any potential anomalies and reporting same. The actual timing chosen can be set by the system user (e.g., run every hour, twice a day, once a day, once a week, once a month, every five weeks, etc.), thereby, further illustrating the flexibility the system offers to management.

The anomaly reports (e.g., which may be any form of notification, alert, etc.) generated by system 200 may be setup to be sent to the store management who configured the system and/or other store employees, such as store associates or managers via their electronic devices (e.g., hand held devices, smart phones, computers, etc.), so that action can be taken by any of these individuals or groups in response to the identified anomalies to check on the identified items in an effort to reduce lost sales with respect to the identified items and/or reduce customer assistance inquiries associated with respect to same. In addition, these reports could be transmitted as either a general report of anomalies detected over a predetermined period of time or an anomaly notice once an individual anomaly is detected.

As mentioned with respect to the process and method discussed above, system 200 will preferably be configured to calculate a rate of sale of the retail items being monitored by frequency of items sold instead of volume and compares the current sales frequency data of those items to the calculated rate of sale of the retail items or historical sales frequency data to detect sales anomalies. In some forms, volume may be used in the prioritization of potential lost profit, such as where a calculation was made for profit equaling the product of retail sales price minus cost, times the average of number sold per period of time being considered (e.g., profit=(retail−cost)×average number sold per period of time considered). Turning back to system 200, the control circuit 214 and database 210 may be located on an on-site central computer system and the POS device 212 may be connected to the on-site central computer system via a network but located elsewhere on-site. Alternatively, the control circuit 214 and database 210 may be located on an off-site central computer system and the POS device 212 may be an on-site POS terminal in communication with the off-site central computer system either directly or indirectly. In still other forms, various portions of the system 200 may be incorporated into fewer electronic devices or broken out or spread out over more electronic devices.

In view of the above, it should be understood that system 200 illustrates one exemplary embodiment of many possible embodiments that allow users to start with sales frequency data to identify potential alerts or anomalies and then dig deeper to customize and/or prioritize the potential anomalies in a way that will address specific needs or concerns of a particular system user. For example, in some forms an apparatus for detecting sales anomalies is provided that includes: means for storing historical sales frequency data; means for obtaining current sales frequency data; and means for comparing the historical sales frequency data to the current sales frequency data to detect potential sales anomalies, the means for comparing being in communication with both the means for storing historical sales frequency data and the means for obtaining current sales frequency data either directly or indirectly. The apparatus may further include means for prioritizing the detected sales anomalies based on predetermined factors. Similarly, the processes and methods 100 discussed above are merely one exemplary embodiment of many possible embodiments that allow users to utilize sales frequency data to identify potential alerts or anomalies and further customize and/or prioritize the potential anomalies in a way that will address specific needs or concerns of a particular system user. For example, in other forms, a computer implemented method for analyzing sales of retail items sold in a retail sales environment is disclosed and includes a control circuit that operates to: obtain historical sales data for retail items from a retail item management database; obtains current sales data for the retail items sold in association with the retail sales environment from a point of sale database associated with the retail sales environment; compares the historical sales data to the current sales data to detect potential sales anomalies corresponding to sales of the retail items; and, optionally, prioritizes the detected anomalies via the retail item management system by weighting the anomalies based on at least one of the following predetermined factors: profit margin, profit dollars, percent of anomaly, average consumption, expense or value of item and/or result of other retail store processes.

In one form, the comparison may be performed by an algorithm that calculates the rate of sale by the frequency of items sold (not volume), mean, and standard deviation for a particular item. In a preferred form, two standard deviation calculations and a confidence threshold that can be weighed more heavily by confirming other store process results. This data will then be compared to the item's recent sales history. If the sales of the recent period fall outside of the longer history, the system will identify this as a potential anomaly. Inventory states, store inventory, and shelf capacity could be used to determine if any detected sales frequency change is acceptable (e.g., based on such inventory or capacity changes, based on not having the product in the store or not having the product available on the shelf, etc.). As mentioned above, the weighting of the confidence levels can be done by the value of an item (e.g., more expensive items have higher priority, etc.), whether another store process has been or will be done (e.g., whether a pick request has been executed based upon a count request, etc.), whether a delivery was completed with that SKU within x amount of time (e.g., the past twenty four hours), etc. Many other factors may be used to determine which anomaly and product should be focused on and in a preferred form these factors can be changed by the user as desired in order to provide a tunable model that is capable of focusing on different metrics and capable of prioritizing different events to address any issue the system user desires. These additional factors provide higher confidence thresholds and better results than conventional OSA/OSCA systems are capable of providing.

Any of the above-mentioned exemplary embodiments may be partially or fully combined with one another to form further embodiments contemplated within the scope of the invention. In addition, while general processes have been described above with respect to FIG. 1, it should be understood that control circuits may be configured to perform more detailed processes in accordance with the above disclosure. For example, an alternate more specific process in accordance with embodiments of the invention is illustrated in FIGS. 3A-3D and is referenced generally by reference numeral 300. As with prior embodiments, items in this embodiment that are similar to prior embodiments will use the same latter two-digit reference numeral but be with the prefix 3 to distinguish embodiments. In this illustrative example, an apparatus or system is provided that with a control circuit 314 and a non-transitory computer readable memory storing a set of instructions executable by the control circuit 314 and configured to cause the control circuit 314 to perform the steps of FIGS. 3A-3D. The system 300 further includes a POS controller 312 that is connected to the control circuit 314 via a network to allow data to be exchanged between both devices.

In the embodiment of FIGS. 3A-3D, a transaction log (Tlog) process is initiated by POS controller 312 in step 330 and a Tlog file is created in step 332. The control circuit 314 performs a Tlog process in step 334 in which the Tlog file is read and stored in Tlog database 310f. Then, in step 336, controller 314 checks a job scheduler which indicates when the Tlog sales processing step 334 should be launched. For example, in the form illustrated, the scheduler 336 may launch the Tlog sales processing step once every x amount of time, where x is configurable or set by a system user. In step 338, a Global Trade Item Number (GTIN) sales processor gets (e.g., fetches or reads) the last Tlog sequence from configuration database 310g. In step 340, the controller 314 retrieves all GTIN data processed for all Tlog sequences since the last run from Tlog database 310f. Next, in step 342, controller 314 narrows the GTIN data (e.g., UPC data, EAN data, etc.) to those processed in the last x amount of time (e.g., 1 hour, such as from noon to 12:59:99). In step 344 controller 314 retrieves a daily record from the hourly sales database 310h (if available), or creates a daily record if no daily record is found in database 310h. Next, in step 346, controller 314 changes a bit from logic 0 to logic 1 for the hour the GTIN sold data comes from and updates the hourly sales database 310h with this record. Controller 314 then determines whether the data it has received through this process is the last GTIN data in step 348. If not, the process returns to step 342 and proceeds from there. If so, controller 314 updates configuration database 310g with the last Tlog sequence processed in step 350 and notifies scheduler and ends this routine in step 352.

In step 354, the scheduler is notified hourly sales data is complete and launches the rate of sale anomaly engine. In step 356, the anomaly engine reads the configuration from supplied data 311 which may include data relating to stanza configuration, required or desired confidence factor, minimum days of sales data, any rule drivers and minimum transactions needed or required. In step 358 controller 314 gets the GTIN data being tracked for exceptions from hourly sales database 310h. Next, in step 360, controller 314 gets pack size information for the identified GTIN from the item information database 310b and gets the system on-hand information for the identified GTIN from the perpetual inventory database or on-hand database 310c in step 362. In step 364, controller 314 reads the last time exception for the identified GTIN (or GTIN being considered at the moment) from exception database 310j. The process or method then determines if the number of sales history data is greater than the minimum number of required records in step 366. If not, the process returns to step 360. If so, the controller 314 determines the number of hours since the last sale from the current hour in step 368 and calculates the GTIN sell frequency, mean, deviation and transaction count for the identified GTIN in step 370. In step 372, the controller 314 determines the number of hours based on the specified confidence level. If in step 374 the controller determines the hours are greater than the specified confidence level of hours, a potential exception is created in step 378 and the system goes on to determine if there are additional GTINs that need to be processed in step 376. If in step 374 the controller determines the hours are not greater than the specified confidence level of hours, the system goes on to determine if there are additional GTINs that need to be processed in step 376. If the answer is yes, the routine returns to step 360 and processes the next GTIN data. If there are no additional GTINs that need to be processed, the routine notifies the scheduler and ends the routine in step 380.

Next, in step 381, the scheduler is notified that the hourly rate of sale data is complete and launches the prioritization routine. The engine reads the prioritization configurations in step 382 from prioritization/weight factor database 310k, and gets potential exception GTIN data in step 383 from potential exception database 310l. Next, the controller 314 gets sell price data for the GTIN from price database 310a and gets cost and pack size from supplier database 310m and calculates cost per single selling unit in step 385. Controller 314 then calculates margin in step 386 and gets sales history for the past x period of time (e.g., 6 weeks) in step 387 from database 310n and calculates profit and sales data for y period of time (e.g., 52 weeks) based on the x period of time of step 387 (e.g., 6 weeks) to get the x period of time average (e.g., 6 week average) and then applies lost sales weight. In step 388, the controller 314 gets on-hand information from on-hand database 310c and applies weight basis on pack size and number of cases. Next, the controller 314 gets backroom BIN data from BIN database 310d and applies specified weight to same in step 389. In some forms, the controller 314 may also get RFID information from an RFID database 310o in step 390, if available (e.g., if the item has been seen in the backroom and applies any specified weight to same. In step 391 the controller 314 calculates the percentage sales anomaly based on the delta or difference of the last sales data to the average mean. In step 392, if more GTINs are to be processed, the routine jumps to step 384; however, if not, the controller 314 prioritizes the data based on weight factors and sales anomaly percentage (e.g., highest to lowest) as specified in step 393. The routine than creates exceptions, alerts and reports in step 394 for system users and reports same either as paper or electronic report or notice sent to the user's hand held device (e.g., a store issued electronic device, a BYOD, etc.). The routine then ends in step 395. Thus, the solutions disclosed herein provide for in-store analysis of sales trends and allow stores to use analytics to determine out of stock items that need addressing and/or to prioritize the out of stock items so they are addressed in order of importance.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for analyzing sales of retail items sold in a retail sales environment comprising:
    presenting retail items for sale at shelves or product display units at a retail store, the retail items including a first retail item, a second retail item, and a third retail item;
    wherein the second retail item and the third retail item are different from the other;
    wherein the shelves or product display units include a first shelf or product display unit and a second shelf or display unit;
    deploying a plurality of point of sale devices for processing current transactions for the retail items in the retail store;
    deploying an electronic network and coupling the electronic network to the plurality of the point of sales devices at the retail store;
    at a central location, deploying a database of historical sales frequency data for the retail items;
    wherein the database comprises a first database that includes the historical sales frequency data and a second database that includes prioritization and weight factors;
    by a control circuit that is deployed at the central location, obtaining historical sales frequency data from the first database for the retail items, the control circuit in communication with the first database via the electronic network;
    obtaining current sales frequency data for the retail items sold in association with the retail sales environment from a point of sale database associated with the retail sales environment, the control circuit in communication with the point of sales database via the electronic network; and
    comparing the historical sales frequency data to the current sales frequency data to detect potential sales anomalies corresponding to sales of the retail items;
    wherein the control circuit prioritizes the detected anomalies according to user input to have a first priority at a first time and a second priority at a second time, the first priority and the second priority determined using information from the data base that comprises confirmations that in-store processes were followed correctly, the first and second priority being adjustable by a user modifying the prioritization and weight factors in the second database;
    wherein the first retail item is placed on the first shelf or product display unit, the first shelf or product display unit being the incorrect placement for the first retail item;
    wherein the second retail item is placed on the second shelf or product display unit, the second retail item being positioned in front of the third retail item, the second shelf or product display unit being the correct placement for the third retail item, but the incorrect placement for the second retail item;
    wherein the detected anomalies include anomalies generated as a result of customer purchases of the first retail item, the second retail item, and the third retail item;
    wherein the detected anomalies are addressed by one or more of:
        removing the first retail item from the first shelf or product display unit; or
        removing the second retail item from the second shelf or product display unit so that the third retail item is at the front of the second shelf or display unit and faces customers in the retail store.

2. The method of claim 1 further comprising creating the historical sales frequency data for the retail items based on historical sales data and storing the historical sales data in the database.

3. The method of claim 2 wherein creating historical sales frequency data comprises calculating a rate of sale of the retail items by frequency of items sold instead of volume; and comparing the historical sales frequency data to the current sales frequency data comprises comparing actual transactions to the calculated rate of sale of the retail items to detect sales anomalies.

4. The method of claim 3 wherein issuing a general report or an anomaly report comprises transmitting information relating to the detected sales anomalies from the control circuit to a remote unit via a second network.

5. The method of claim 4 wherein the remote unit is a mobile electronic or handheld device and the second network is a wireless network, and transmitting information relating to the detected anomalies comprises wirelessly communicating an anomaly notice to the mobile electronic or handheld device via the wireless network.

6. The method of claim 1 wherein issuing a general report of anomalies comprises transmitting a prioritized list of detected anomalies to be investigated by the user.

7. The method of claim 1 wherein prioritizing the detected anomalies further comprises weighting the anomalies based on at least one of the following predetermined factors: profit margin, profit dollars, percent of anomaly, average consumption, or expense or value of item.

8. The method of claim 1 wherein prioritizing the detected anomalies comprises prioritizing the detected anomalies based on whether at least one of:
 a pick request has been made within a predetermined amount of time for the identified item,
 count request has been made within a predetermined amount of time for the identified item,
 a delivery has been made within a predetermined amount of time for the identified item,
 an entry has been made in a store tracking or identification system, and/or
 an entry has been made in a store inventory system.

9. The method of claim 1 further comprising waiting to compare the historical sales frequency data to current sales frequency data until a minimum threshold of historical sales have occurred and at least one standard deviation has been performed on the historical sales frequency data to account for variation in the historical sales frequency data.

10. The method of claim 2 wherein creating historical sales frequency data for retail items comprises creating a transaction log (Tlog) containing historical sales data for the items within the store, and comparing historical sales frequency data to the current sales frequency data comprises comparing actual transactions to historical sales data on an individual per item basis and making this comparison for a predetermined number of the retail items within the store as identified by a management system user so that the system may be used to track as few or as many retail items carried by the retail store as desired.

11. The method of claim 10 further comprising providing the user the option to select the predetermined number of items to be compared to historical sales data by the retail items in the entire store, within a specific department within the store, within a specific category within the specific department and/or within a sub-category within the specific category so that the items monitored for sales anomalies may be customized as desired.

12. An inventory management system capable of identifying possible sales anomalies to improve sales comprising:
 a retail store including retail items that are presented on shelves or product display units, the retail items including a first retail item, a second retail item, and a third retail item;
 wherein the second retail item and the third retail item are different from the other;
 wherein the shelves or product display units include a first shelf or product display unit and a second shelf or display unit;
 a plurality of point of sale devices for processing current transactions for the retail items at the retail store;
 an electronic network coupled to the plurality of point of sales devices at the retail store;
 at a central location, a database of historical sales frequency data for retail items;
 wherein the database comprises a first database that includes the historical sales frequency data and a second database that includes prioritization and weight factors;
 at the central location, a control circuit in communication with the database and point of sale devices via the network, the control circuit configured to compare current sales frequency data to the historical sales frequency data obtained from the first database to detect possible sales anomalies via the management system;
 wherein the control circuit prioritizes the detected anomalies according to user input to have a first priority at a first time and a second priority at a second time, the first priority and the second priority determined using information from the data base that comprises confirmations that in-store processes were followed correctly, the first and second priority being adjustable by a user modifying the prioritization and weight factors in the second database;
 wherein the first retail item is placed on the first shelf or product display unit, the first shelf or product display unit being the incorrect placement for the first retail item;
 wherein the second retail item is placed on the second shelf or product display unit, the second retail item being positioned in front of the third retail item, the second shelf or product display unit being the correct placement for the third retail item, but the incorrect placement for the second retail item;
 wherein the detected anomalies include anomalies generated as a result of customer purchases of the first retail item, the second retail item, and the third retail item;
 wherein the detected anomalies are addressed by one or more of:
  removing the first retail item from the first shelf or product display unit; or
  removing the second retail item from the second shelf or product display unit so that the third retail item is at the front of the second shelf or display unit and faces customers in the retail store.

13. The system of claim 12 wherein the control circuit is configured to calculate a rate of sale of the retail items by frequency of items sold instead of volume and compares the current sales frequency data to the calculated rate of sale of the retail items to detect sales anomalies.

14. The system of claim 12 further comprising a network interface and wherein the control circuit is configured to notify a user of the detected sales anomalies via the network interface.

15. The system of claim 14 wherein the control circuit and database are located on an on-site central computer system and the point of sale device is a point of sale terminal connected to the on-site central computer system but located elsewhere on-site.

16. The system of claim 14 wherein the control circuit and database are located on an off-site central computer system and the point of sale device is an on-site point of sale terminal in communication with the off-site central computer system either directly or indirectly.

17. The system of claim 14 wherein the control circuit is configured to notify the user by transmitting either a general report of anomalies detected over a predetermined period of time or an anomaly notice once an individual anomaly is detected.

18. The system of claim 12 wherein the control circuit further prioritizes the detected anomalies based on predetermined factors including at least one of: profit margin, profit dollars, percent of anomaly, average consumption, expense or value of item and/or result of other retail store processes.

19. The system of claim 12 wherein the confirmations that in-store processes were followed correctly are based on an occurrence of at least one of the following:
   a pick request has been made within a predetermined amount of time for the identified item;
   a count request has been made within a predetermined amount of time for the identified item;
   a delivery has been made within a predetermined amount of time for the identified item;
   an entry has been made in a store tracking or identification system; and/or
   an entry has been made in a store inventory system.

20. The system of claim 12 wherein the control circuit is configured to wait to compare the actual transactions to the historical sales data until a minimum threshold of historical sales have occurred and at least one standard deviation has been performed on the historical sales data to account for variation in the historical sales data.

21. The system of claim 12 wherein the database of historical sales data comprises a transaction log (Tlog) containing historical sales data for the items within the store, and the control circuit is configured to compare the actual transactions to the Tlog data on an individual per item basis and for a predetermined number of the retail items within the store as identified by the system user so that the system may be used to track as few or as many retail items carried by the retail store as desired.

22. The system of claim 21 wherein the control circuit is configured to allow the user to select the predetermined number of items to be compared to historical sales data by all retail items or individual retail items within: the entire store, a specific department within the store, a specific category within the specific department and/or a specific sub-category within the specific category, so that the items monitored for sales anomalies may be customized as desired.

23. An apparatus for detecting sales anomalies comprising:
   a retail store including shelves and display units that present retail items for sale to customers, the retail items including a first retail item, a second retail item, and a third retail item;
   wherein the second retail item and the third retail item are different from the other;
   wherein the shelves or product display units include a first shelf or product display unit and a second shelf or display unit;
   a plurality of point of sale devices that are configured to process current transactions for the retail items at the retail store;
   an electronic network coupled to the plurality of point of sales devices at the retail store;
   at a central location, means for storing historical sales frequency data comprising a first database that includes the historical sales frequency data and a second database that includes prioritization and weight factors;
   means for obtaining current sales frequency data coupled to the plurality of point of sales devices; and
   control circuit means for comparing the historical sales frequency data to the current sales frequency data to detect potential sales anomalies, the control circuit means for comparing being in communication with both the means for storing historical sales frequency data and the means for obtaining current sales frequency data either directly or indirectly;
   wherein the control circuit means prioritizes the detected anomalies according to user input to have a first priority at a first time and a second priority at a second time, the first priority and the second priority determined using information from the data base that comprises confirmations that in-store processes were followed correctly, the first and second priority being adjustable by a user modifying the prioritization and weight factors in the second database;
   wherein the first retail item is placed on the first shelf or product display unit, the first shelf or product display unit being the incorrect placement for the first retail item;
   wherein the second retail item is placed on the second shelf or product display unit, the second retail item being positioned in front of the third retail item, the second shelf or product display unit being the correct placement for the third retail item, but the incorrect placement for the second retail item;
   wherein the detected anomalies include anomalies generated as a result of customer purchases of the first retail item, the second retail item, and the third retail item;
   wherein the detected anomalies are addressed by one or more of:
      removing the first retail item from the first shelf or product display unit; or
      removing the second retail item from the second shelf or product display unit so that the third retail item is at the front of the second shelf or display unit and faces customers in the retail store.

24. The apparatus of claim 23 wherein the control circuit means further prioritizes the detected sales anomalies based on predetermined factors including at least one of: profit margin, profit dollars, percent of anomaly, average consumption, or expense or value of item.

25. A computer implemented method for analyzing sales of retail items sold in a retail sales environment comprising:
   operating a plurality of point of sales devices at a retail store, the plurality of point of sale devices configured to process current transactions for retail items at the retail store, the retail items including a first retail item, a second retail item, and a third retail item;
   wherein the second retail item and the third retail item are different from the other;
   wherein the shelves or product display units include a first shelf or product display unit and a second shelf or display unit;
   at a central location, deploying a database of historical sales frequency data for the retail items;
   wherein the database comprises a first database that includes the historical sales frequency data and a second database that includes prioritization and weight factors;
   by a control circuit deployed at the central location, obtaining historical sales data for retail items from the first database;

obtaining current sales data for the retail items sold in association with the retail sales environment from a point of sale database associated with the retail sales environment;

comparing the historical sales data to the current sales data to detect potential sales anomalies corresponding to sales of the retail items;

wherein the control circuit prioritizes the detected anomalies according to user input to have a first priority at a first time and a second priority at a second time, the first priority and the second priority determined using information from the data base that comprises confirmations that in-store processes were followed correctly, the first and second priority being adjustable by a user modifying the prioritization and weight factors in the second database;

wherein the first retail item is placed on the first shelf or product display unit, the first shelf or product display unit being the incorrect placement for the first retail item;

wherein the second retail item is placed on the second shelf or product display unit, the second retail item being positioned in front of the third retail item, the second shelf or product display unit being the correct placement for the third retail item, but the incorrect placement for the second retail item;

wherein the detected anomalies include anomalies generated as a result of customer purchases of the first retail item, the second retail item, and the third retail item;

wherein the detected anomalies are addressed by one or more of:

removing the first retail item from the first shelf or product display unit; or removing the second retail item from the second shelf or product display unit so that the third retail item is at the front of the second shelf or display unit and faces customers in the retail store.

\* \* \* \* \*

UNITED STATES PATENT AND TRADEMARK OFFICE
CERTIFICATE OF CORRECTION

PATENT NO. : 10,453,009 B2
APPLICATION NO. : 15/184358
DATED : October 22, 2019
INVENTOR(S) : Richard B. Ulrich, Alvin S. Taulbee and Steven E. Thomas Page 1 of 1

It is certified that error appears in the above-identified patent and that said Letters Patent is hereby corrected as shown below:

On the Title Page

Item [73], delete "Walmart," and insert -- Walmart --, therefor.

In the Claims

Claim 8, Column 15, Line 28, before "count", insert -- a --, therefor.

Signed and Sealed this
Eighteenth Day of February, 2020

Andrei Iancu
*Director of the United States Patent and Trademark Office*